Aug. 10, 1926.
W. S. DU CHARME
1,595,822
ELECTRICAL COOKING APPARATUS
Filed April 16, 1924    3 Sheets-Sheet 3
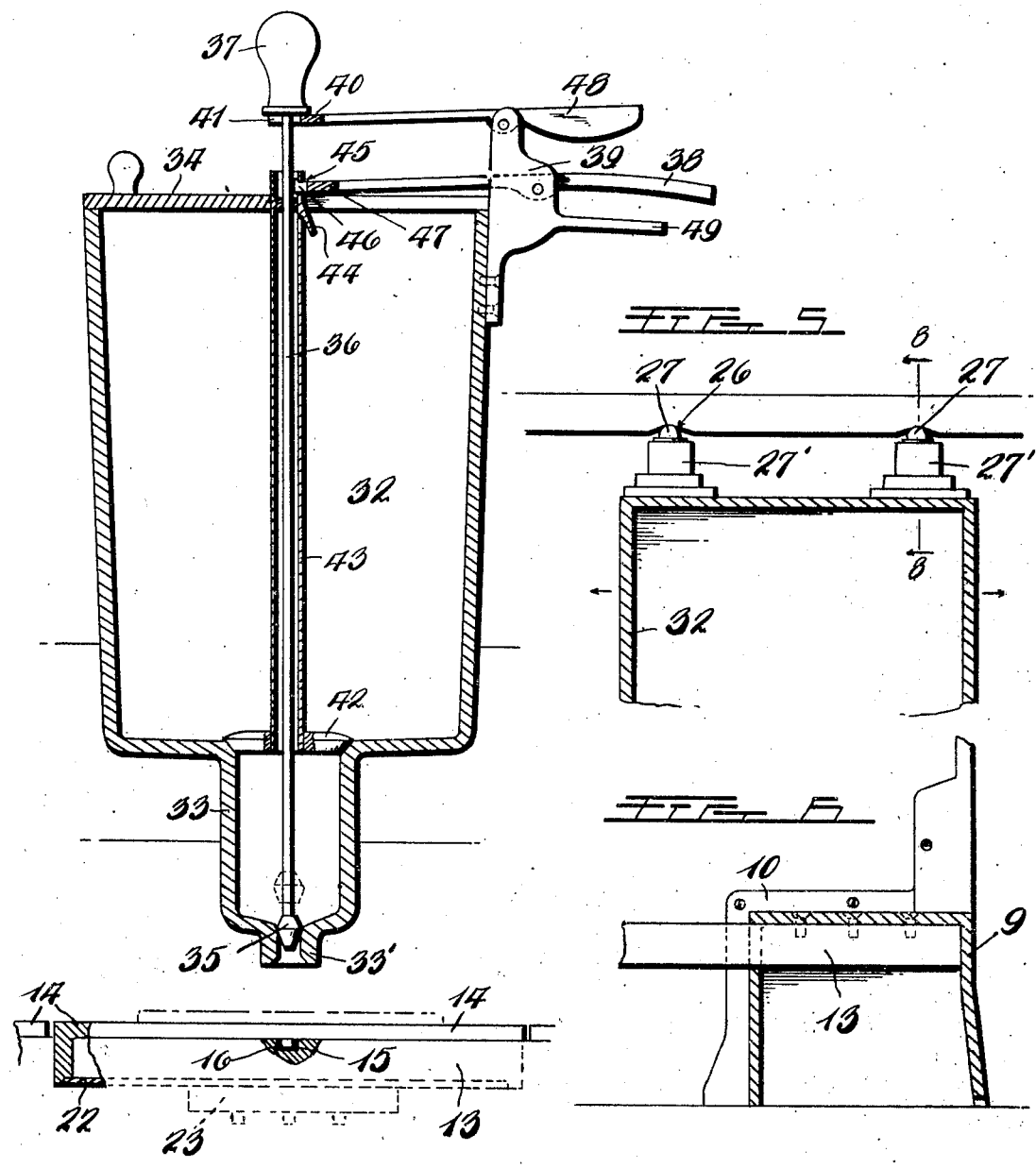
INVENTOR.
William S. DuCharme
BY John A. Brummhardt
ATTORNEY.

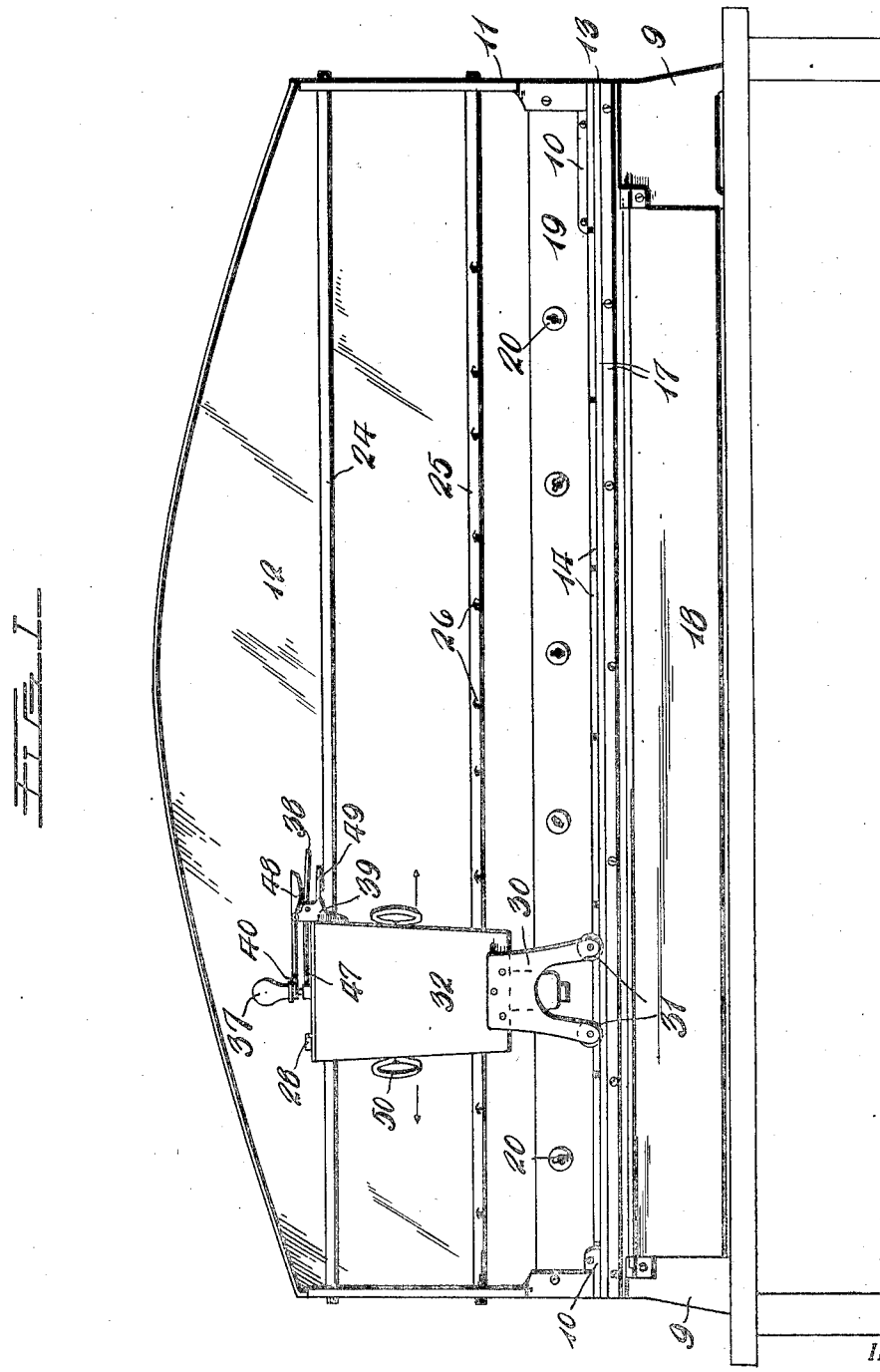

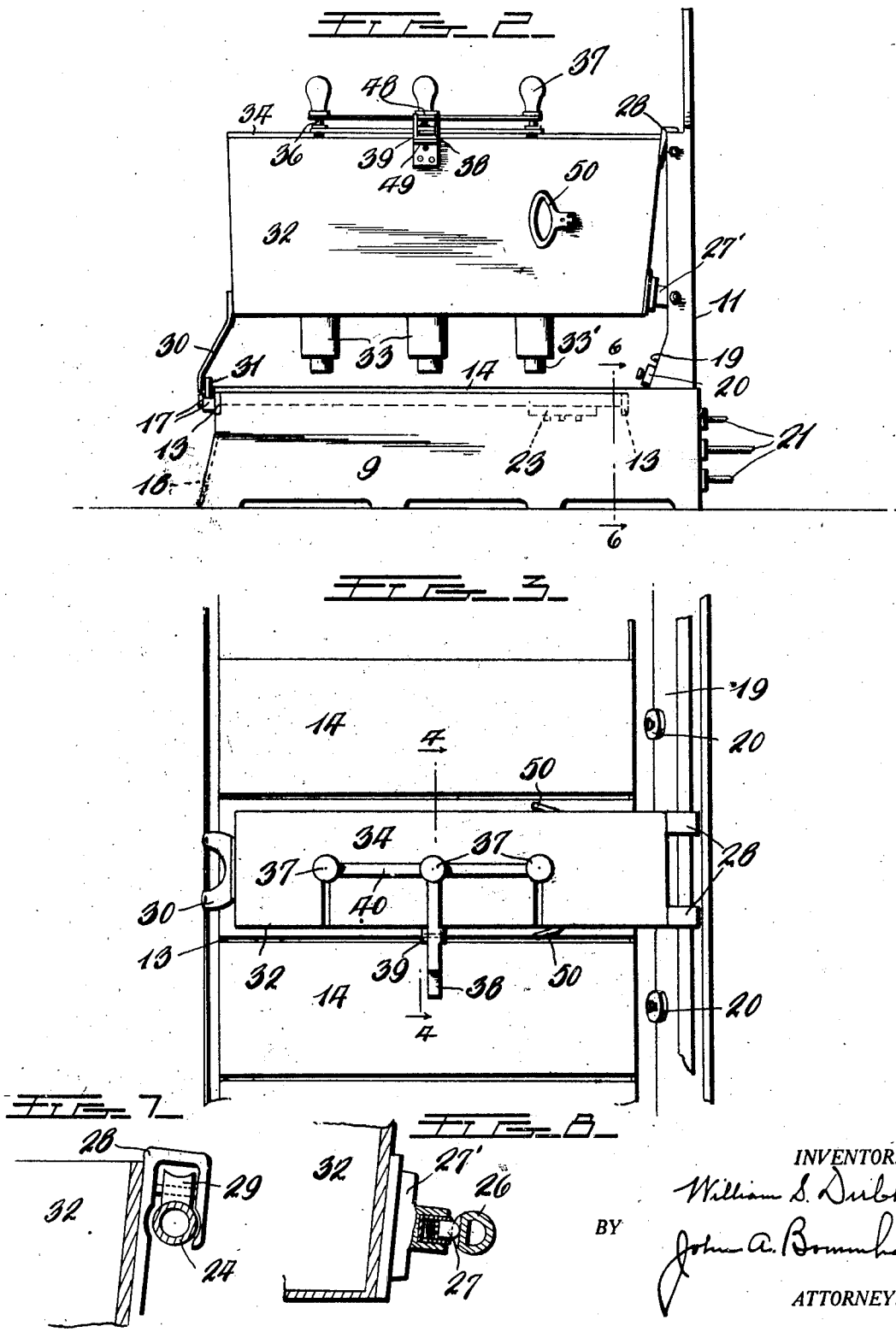

Patented Aug. 10, 1926.

1,595,822

UNITED STATES PATENT OFFICE.

WILLIAM S. DU CHARME, OF CLEVELAND, OHIO, ASSIGNOR TO THE DU CHARME ELECTRICAL MANUFACTURING COMPANY, OF CLEVELAND, OHIO, A CORPORATION OF OHIO.

ELECTRICAL COOKING APPARATUS.

Application filed April 16, 1924. Serial No. 706,991.

This invention is an improved electrical cooking apparatus having for an object to provide means whereby a rapid output of batter cakes or the like may be obtained.

Another object is to provide an apparatus of this character having a cooking surface and a batter tank arranged to deposit predetermined quantities of batter upon the surface.

A further object is to provide a battery of plates having heating units so arranged as to be relatively independently operable.

A still further object is to provide a cooking apparatus of this character in which a batter tank is movable above a set of cooking plates and includes means for accurately positioning the tank over any one of the plates.

It is also an object to provide means for feeding a uniform quantity of batter at each operation.

Other objects will be in part obvious and in part pointed out hereinafter.

In order that the invention and its mode of operation may be readily understood by persons skilled in the art, I have in the accompanying illustrative drawings and in the following detailed description based thereon set out one possible embodiment of the same.

In these drawings:

Fig. 1 is a front elevation of the cooking apparatus.

Fig. 2 is an end view thereof.

Fig. 3 is a fragmentary top plan view.

Fig. 4 is a sectional view taken substantially on a plane of line 4—4 of Figure 3.

Fig. 5 is a detail view of the devices for centering the batter tank over each plate.

Fig. 6 is a sectional view substantially on the line 6—6 of Figure 2.

Fig. 7 is a detail view of the hanger carried by the upper inner end of the batter tank, and Fig. 8 is a sectional view taken substantially on the line 8—8 of Figure 5.

Broadly stated, my cooking apparatus comprises an elongated frame including a pair of spaced longitudinal bars supporting a set of transversely arranged heating or cooking plates, each individually operable, and a batter tank positioned for movement longitudinally above the plates and adapted to deposit quantities of batter upon any of the plates for cooking.

The main frame comprises a pair of transverse end members 9, one being of greater width than the other and arranged to support a receptacle over which the batter tank may be positioned when the apparatus is not being used, or when all of the plates are cooking cakes or the like. As shown in Figure 6, the end members 9, comprise substantially inverted U-shaped castings having angular flanges 10 whereby connection to a back plate 11 is effected. This back plate preferably mounts a mirror 12 or the like. A pair of vertically disposed longitudinal bars 13 is arranged as shown in Figure 2, to connect the two end members, said bars being secured to the end members by machine screws or the like. These bars are transversely spaced and serve as supports for a set of heating or cooking plates 14 carrying depending pins 15 fitting in recesses 16 formed in the supporting bar, these pins serving to center and equi-distantly space the plates at all times even when expanded due to the heating. A trackway is formed upon the forward side of the frame for a purpose which will be pointed out. This trackway consists in securing a pair of bars 17 upon the forward or front bar, forming a longitudinal channel in which supporting elements carried by a batter tank are positioned. A hinged door or cover 18 is mounted upon the front of the frame and closes the space between the two end members as illustrated in Figure 1 of the drawings. Mounted upon an inclined portion 19 of the back is a set of control switches 20, one for each plate 14. In Figure 2, current conducting wires 21 are shown and are adapted for connection to heating elements carried by the plates.

These plates each include an elongated body hollowed out to receive a heating element which is retained therein by a cover plate 22 mounting a terminal box 23 through which electrical connection is made.

As a means for assisting in the support of a slidable batter tank, a pair of upper and lower vertically spaced guide and supporting rods 24 and 25 is mounted upon the back 11. The lower rod 25, as shown in Figures 1, 5 and 8, is provided with spaced pairs of notches or recesses 26 which seat spring actuated fingers or plungers 27 arranged in spaced brackets 27' as shown in Figure 5. These brackets are attached to the lower portion of the inner end wall of the tank. Through this arrangement of plungers, means is provided to accurately center the batter tank over a plate upon which batter is to be deposited. As shown in Figure 7, the upper end of the tank T is provided with a bracket 28 arranged to mount a grooved wheel 29 which rests upon the upper rod 24, thus providing the supporting means for the inner end of the tank. In order that the outer end may be supported, I attach a bracket 30 thereto, the lower ends carrying a pair of spaced wheels or rollers 31 fitting in the channel trackway.

This batter tank T consists of a main body portion or reservoir 32 having a set of depending longitudinally spaced measuring cups 33 formed integrally therewith and an open upper end closable by means of a cover plate 34. Each measuring cup has a closable outlet 33' arranged to seat a valve 35 carried by a rod 36 which extends upwardly through the cover plate 34 and mounts a knob or the like 37. This valve is operable through the rod 36 by means of a lever 48 pivoted to a bracket 39 and carrying at its inner end a cross bar 40 provided with bifurcated fingers or forks 41 which straddle the rod as shown in Figure 4. In order to close the opening between the main tank body and the measuring cup, I provide a valve 42 mounted upon the lower end of a sleeve 43 which is of sufficient diameter to permit backing up therethrough of air from the cup 33 to insure complete filling and emptying of said cup. The upper end of the sleeve 43 is closed, an outlet or return opening 44 being formed at a point below the cover plate so as to permit excess batter to return to the tank and to allow air to escape as before stated. This opening 44 also allows air to enter when the cup is being emptied and eliminates the tendency toward creating a vacuum. Immediately above the closure for the sleeve is formed an opening 45 for the reception of a hooked finger 46 carried by a cross bar 47. This bar 47 is integrally formed and operable by a handle or lever portion 38 pivotally mounted upon the aforementioned bracket 39. This bracket 39 carries an integral handle 49 for co-action with the levers 38 and 48 to feed the batter from the tank to the cooking plate. Handles 50 are mounted upon the sides of the tank to facilitate movement thereof along the trackway. As shown, the cover plate 34 is recessed or notched to allow for positioning upon the body portion.

In using this apparatus a supply of batter is placed in the tank "T" and the parts being positioned as shown in Figure 4, the lever 38 is moved, thereby raising the valve 42 and allowing the batter to fill the measuring cup. As stated, the entire filling and emptying of the cup 33 is assured due to the means heretofore described and shown to permit escape of air from the cup.

The valve 42 is then allowed to close and the tank T is shifted to a position above the cooking plate to be used. The plungers 27 automatically seat themselves in the recesses 26 and center the tank over the plate, at which stage of operation the lever 48 is moved to lift the valve 35, thus permitting the batter to be deposited upon one of the plates 14. While I have shown the tank as being equipped with a set of three measuring cups it is understood that other numbers may be employed.

Manifestly, the construction shown is capable of considerable modification and such modification as may fall within the scope of my claims, I consider within the spirit of my invention.

I claim:

1. In a cooking apparatus, a batter tank having an open upper end, a measuring cup depending from the tank bottom, filling and discharge control valves for the cup, a hollow valve stem on the inlet valve opening through the valve into the cup, said stem having an air opening near its other end, a stem on the outlet valve extending through the hollow stem and spaced from its wall, a cover plate having a slot receiving the valve stems, a pair of superposed levers pivoted to one side of the tank and readily releasable connection between the levers and valve stem.

2. In a cooking apparatus, a batter tank having an open upper end, a set of integrally formed measuring cups depending from the bottom of the tank and having filling and discharge valves for the openings, a hollow valve stem on each inlet valve opening into the cup through said valve and having its upper end extended above the tank, said upper end having an air vent, a downwardly inclined lip guarding said vent, a stem fixed to each discharge valve and extending through the hollow valve stem and above the tank, a bracket fixed to one side of the tank and having a handle thereon, a pair of superposed levers vertically alined with said handle, loose separable connection between the ends of the levers and said valve stems, and a slotted cover plate arrangeable over the open upper end of said tank.

In testimony whereof, I affix my signature.

WILLIAM S. DU CHARME.